US009981599B2

(12) United States Patent
Nilsson

(10) Patent No.: US 9,981,599 B2
(45) Date of Patent: May 29, 2018

(54) SYSTEM AND METHOD FOR ACTIVATION OF WARNING LIGHTS OF A VEHICLE

(71) Applicant: VOLVO CAR CORPORATION, Gothenburg (SE)

(72) Inventor: Rickard Nilsson, Hisings Karra (SE)

(73) Assignee: VOLVO CAR CORPORATION (SE)

( * ) Notice: Subject to any disclaimer, the term of this patent is extended or adjusted under 35 U.S.C. 154(b) by 0 days. days.

(21) Appl. No.: 15/591,234

(22) Filed: May 10, 2017

(65) Prior Publication Data
US 2017/0334349 A1 Nov. 23, 2017

(30) Foreign Application Priority Data
May 17, 2016 (EP) .................... 16169819

(51) Int. Cl.
B60Q 1/52 (2006.01)
B62D 15/02 (2006.01)
G07C 5/02 (2006.01)
B60W 40/114 (2012.01)
B60W 40/103 (2012.01)
G07C 5/08 (2006.01)

(52) U.S. Cl.
CPC .............. B60Q 1/52 (2013.01); B60W 40/103 (2013.01); B60W 40/114 (2013.01); B62D 15/024 (2013.01); G07C 5/02 (2013.01); G07C 5/0816 (2013.01)

(58) Field of Classification Search
CPC ..... B60Q 1/52; B60W 40/103; B60W 40/114; B62D 15/024; G07C 5/02; G07C 5/0816
See application file for complete search history.

(56) References Cited

U.S. PATENT DOCUMENTS

| 6,023,221 A | 2/2000 | Michelotti |
| 7,149,614 B2* | 12/2006 | Traechtler ........... B60T 8/17554 701/38 |
| 8,301,108 B2* | 10/2012 | Naboulsi ............ B60R 11/0264 340/575 |
| 9,652,906 B1* | 5/2017 | Kondou ............... G07C 5/0816 |

(Continued)

FOREIGN PATENT DOCUMENTS

| DE | 4139215 A1 | 6/1993 |
| EP | 2135782 A1 | 12/2009 |

(Continued)

OTHER PUBLICATIONS

Extended European Search Report dated Nov. 15, 2016, Application No. 16169819.6-1756, Applicant Volvo Car Corporation, 6 Pages.

Primary Examiner — Nay Tun
(74) Attorney, Agent, or Firm — Brooks Kushman P.C.

(57) ABSTRACT

There is provided a method for activating warning lights in a vehicle, the method comprising: determining a yaw rate of the vehicle; determining a sideslip angle of the vehicle; comparing the yaw rate to a predetermined yaw rate threshold value; comparing the sideslip angle to a predetermined sideslip angle threshold value; and f the yaw rate exceeds the predetermined yaw rate value; if the sideslip angle exceeds the predetermined sideslip angle value; and if it is determined that the vehicle reaches a standstill within a predetermined time after the yaw rate and sideslip values have been exceeded, activating warning lights of the vehicle. There is also provided a system configured to perform the above described method.

20 Claims, 3 Drawing Sheets

(56) References Cited

U.S. PATENT DOCUMENTS

| | | | | |
|---|---|---|---|---|
| 9,842,496 B1* | 12/2017 | Hayward | ............... | G08G 1/091 |
| 9,870,649 B1* | 1/2018 | Fields | ................... | G07C 5/008 |
| 2002/0035422 A1* | 3/2002 | Sasaki | ................... | G07C 5/085 |
| | | | | 701/32.2 |
| 2004/0183663 A1* | 9/2004 | Shimakage | .......... | B62D 15/029 |
| | | | | 340/436 |
| 2006/0058934 A1* | 3/2006 | Le | ....................... | B60R 21/0132 |
| | | | | 701/38 |
| 2009/0210112 A1* | 8/2009 | Waldbauer | ............ | B60T 8/1708 |
| | | | | 701/42 |
| 2009/0319127 A1* | 12/2009 | Ghoneim | ................ | B60Q 9/00 |
| | | | | 701/41 |
| 2011/0001617 A1* | 1/2011 | Roeike | ............... | B60T 8/17558 |
| | | | | 340/439 |
| 2011/0106381 A1* | 5/2011 | Filev | ..................... | B62D 6/007 |
| | | | | 701/40 |
| 2012/0179349 A1* | 7/2012 | Yamakado | ........... | B60T 8/1755 |
| | | | | 701/89 |
| 2012/0242511 A1* | 9/2012 | Morgan | ................. | B60R 25/04 |
| | | | | 340/989 |
| 2012/0245790 A1 | 9/2012 | Farmer et al. | | |

FOREIGN PATENT DOCUMENTS

| | | |
|---|---|---|
| GB | 2300705 A | 11/1996 |
| JP | 2015074420 A | 4/2015 |

* cited by examiner

SYSTEM AND METHOD FOR ACTIVATION OF WARNING LIGHTS OF A VEHICLE

CROSS-REFERENCE TO RELATED APPLICATIONS

This application claims foreign priority benefits under 35 U.S.C. § 119(a)-(d) to European patent application number EP 16169819.6, filed May 17, 2016, which is incorporated by reference in its entirety.

TECHNICAL FIELD

The present disclosure relates to a system and a method for automatic activation of warning lights of a vehicle.

BACKGROUND

Today's electronic stability control (ESC) systems are typically very efficient in preventing a vehicle from spinning. There are however situations, where the vehicle can spin despite an active ESC system. For example, if the vehicle is braking on a surface where different wheels experience different friction, also referred to as a split-μ surface, with two wheels on low-μ and two wheels on high-μ and for some reason both rear wheels end up on low-μ then the vehicle will spin regardless of driver input. Other cases include driving on black ice with excessive driver input, ESC hydraulic failure or a flat tire, worn out or otherwise defective rear tire.

If a car spins despite an active ESC system, the driver is often too shocked to remember to activate the hazard lights. Accordingly, it is desirable to provide a function in a vehicle for automatically activating the warning lights if the driver loses control of the vehicle.

SUMMARY

In view of above-mentioned and other drawbacks of the prior art, it is an object of the present disclosure to provide an improved function in a vehicle for automatically activating the warning lights if the driver loses control of the vehicle.

According to a first aspect of the disclosure, there is provided a method for activating warning lights in a vehicle, the method comprising: determining a yaw rate of the vehicle; determining a sideslip angle of the vehicle; comparing the yaw rate to a predetermined yaw rate threshold value; comparing the sideslip angle to a predetermined sideslip angle threshold value; and if the yaw rate exceeds the predetermined yaw rate value; if the sideslip angle exceeds the predetermined sideslip angle value; and if it is determined that the vehicle reaches a standstill within a predetermined time after the yaw rate and sideslip values have been exceeded, activating warning lights of the vehicle.

The yaw rate is determined as a vehicle's angular velocity around its vertical axis, and the sideslip angle is the angle between a rolling wheel's actual direction of travel and the direction towards which it is pointing.

The present disclosure is based on the realization that a reliable method for activating warning light of a vehicle can be achieved by observing both the yaw rate and the side slip angle of the vehicle. In principle, it could be possible to determine if the driver has lost control of the vehicle using only one of the yaw rate and the side slip angle. However, there are examples of highly dynamic driving situations where using only one measure would provide an inaccurate result. For example, in an aggressive double lane change situation on a high-μ (high friction) surface, the vehicle has a high yaw rate but a limited side slip angle. Another example is a maneuver where the driver releases the throttle mid turn on low-μ, which induces over steer, in which case the vehicle has a high side slip angle but a low yaw rate.

Accordingly, by means of the present disclosure, false positives can be avoided by using both the yaw rate and the sideslip angle when determining if the user has lost control of the vehicle and if the warning lights should be activated. Activation of the warning lights also requires that the vehicle reaches a standstill within a predetermined time after an event where the predetermined values of the yaw rate and sideslip angle have been exceeded.

A reason for determining that the vehicle reaches a standstill within a predetermined time is to avoid false activation of the warning lights, specifically for the case that the driver spins the vehicle and still manage to end up facing the right way at speed. The driver would then continue his journey and when he then comes to a standstill minutes or hours after the incident the lights would then activate unless the timer condition was included in the method.

According to one embodiment of the disclosure, the predetermined value of the sideslip angle is in the range of 10-30°, such as 20°.

According to one embodiment of the disclosure, the predetermined value of the yaw rate is in the range of 30-50°/s, such as 40°/s.

The specific combinations of sideslip angle and yaw rate resulting in an unstable vehicle depends on a range of parameters such as chassis parameters, tire type, tire wear, road friction etc. Moreover, the details outlining which combinations of side slip angle and yaw rate leads to an unstable vehicle will be discussed in the detailed description.

According to one embodiment of the disclosure, the steps of determining a yaw rate of the vehicle and determining a sideslip angle of the vehicle are preferably performed substantially simultaneously, such that an instantaneous status of the vehicle can be determined. It would of course also be possible to determine the values sequentially, provided that the time between the determination of the two values are sufficiently short such that the values can be considered to accurately represent the status of the vehicle.

According to one embodiment of the disclosure, the predetermined time may be determined based on a speed of the vehicle at the time when it is determined that the sideslip and the yaw rate exceeds the predetermined values. Since the time it takes for an out of control vehicle to come to a standstill will be different if the driver loses control at 200 km/h or at 50 km/h, it is preferable that the time is tunable based on the vehicle velocity.

In one embodiment of the disclosure, determining that the vehicle reaches a standstill may comprise determining a wheel speed for all four wheels of the vehicle, thereby ensuring that the vehicle is not moving such that the warning lights may be activated. However, in case of an integer representation of wheel speeds, a vehicle speed lower than the wheel speed resolution of typically 0.7 m/s cannot be detected using the wheel speed sensors alone. A robust way detecting standstill would then be to require that all four wheel speed sensors show values equal to the lowest detectable speed (which equals the resolution) at which time a stand still timer would start and after a tunable time period, it would be determined that the vehicle is at a standstill.

According to one embodiment of the disclosure, a predetermined time based on the speed of the vehicle is reduced if it is determined that a brake pressure exceeds a predetermined brake pressure value and/or if it is determined that the engine torque is below a predetermined engine torque value. Thereby, the predetermined time can be reevaluated, and shortened, based on brake pressure and/or engine torque, such that it can be determined that the vehicle has reached a standstill sooner than if the predetermined time is based solely on the vehicle speed.

In one embodiment, the yaw rate of the vehicle and the sideslip angle of the vehicle may advantageously be determined continuously during operation of the vehicle such that it can be rapidly detected if a driver loses control of the vehicle.

According to one embodiment of the disclosure, a sideslip angle of the vehicle may advantageously be determined based on the wheel speeds of all four wheels, a longitudinal acceleration, a lateral acceleration, a roll rate and a yaw rate of the vehicle.

Furthermore, the accuracy of the sideslip angle may in addition be improved based on vertical acceleration information of the vehicle.

According to a second aspect of the disclosure, there is provided a control system for activating warning lights in a vehicle, the control system comprising: a yaw rate detection module; a sideslip angle detection module; a comparing module configured to compare the yaw rate to a predetermined yaw rate value and to compare the sideslip angle to a predetermined sideslip angle value, a control module for controlling activation of the warning lights; wherein the control module is further configured to activate the warning lights if it is determined that the vehicle reaches a standstill within a predetermined time after said yaw rate and sideslip values have been exceeded.

The system typically includes four wheel speed sensors, two accelerometers and two rate sensors. However, the skilled person realizes that the required information could be acquired in many different ways.

The above described modules may be separate units, such as specific engine control units, or the modules may be represented by integrated functionality in a control unit.

Additional effects and features of the second aspect of the disclosure are largely analogous to those described above in connection with the first aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the method and system according to the present disclosure are mainly described with reference to a method in an automobile.

Figure 1:
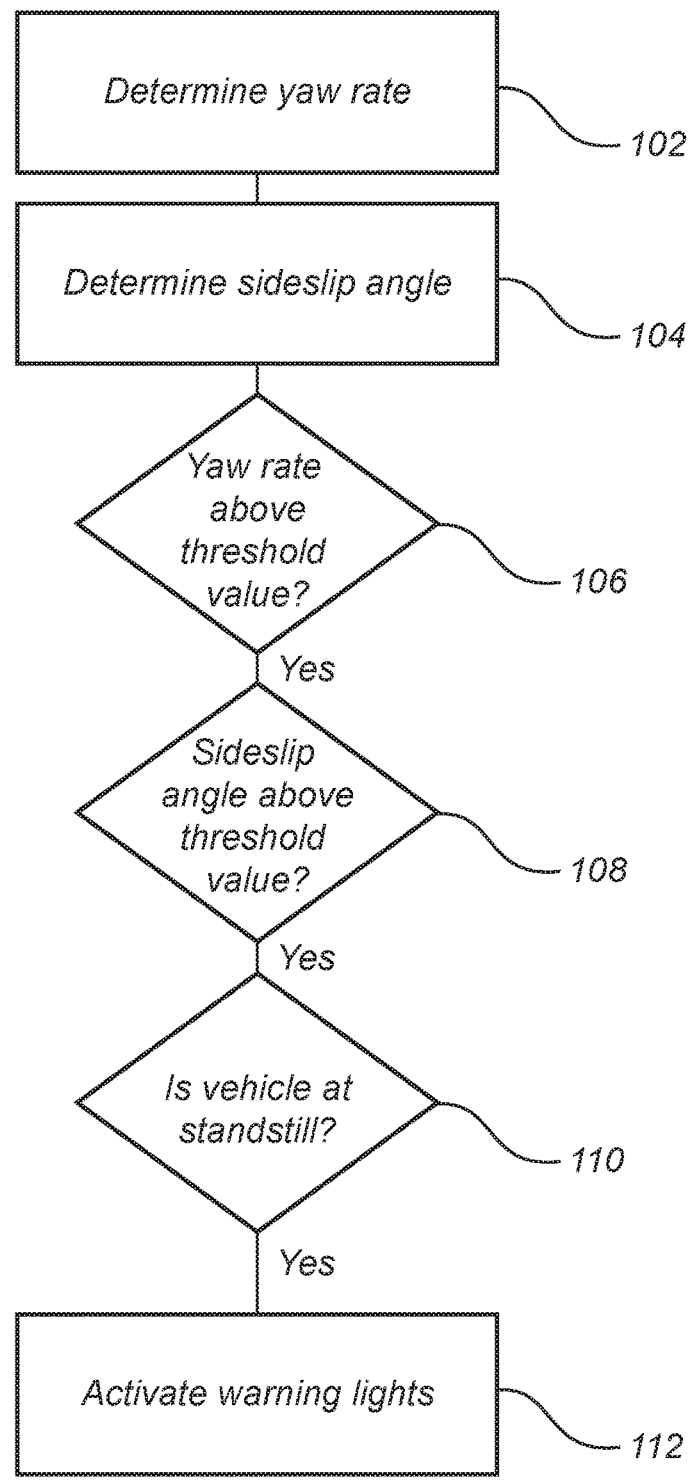
FIG. 1 is a flow chart outlining the general steps of a method according to an embodiment of the disclosure.

FIG. 1 is a flow chart outlining the general steps of a method for activating warning lights in a vehicle. The method comprises determining a yaw rate 102 and a sideslip angle 104 of the vehicle. This may be done continuously by means of control systems present in the vehicle. The determined yaw rate is compared 106 to a predetermined yaw rate threshold value and the determined sideslip angle is compared 108 to a predetermined sideslip angle threshold value. If the yaw rate exceeds the predetermined yaw rate threshold value and if the sideslip angle exceeds the predetermined sideslip angle threshold value, it can be determined that the driver has lost control of the vehicle and that an accident may occur. After it has been determined the vehicle is out of control, it is determined 110 if the vehicle reaches a standstill within a predetermined time, after which time the warning lights of the vehicle are activated 112. However, if it determined that the vehicle is out of control, but that it does not reaches a standstill within the predetermined time, it is likely that the driver regained control of the vehicle and there is thus no need to activate the warning lights. After activation of the warning lights, the warning light may for example be deactivated manually or after a predetermined time.

Furthermore, even though the yaw rate and sideslip angle are illustrated in the flow chart as being determined and evaluated sequentially, they may equally well be evaluated simultaneously.

Figure 2A:
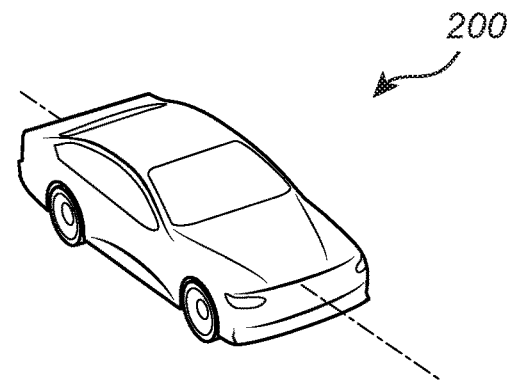
FIGS. 2A-C schematically illustrates a vehicle in which a method according to embodiments of the disclosure is utilized.
Figure 2B:
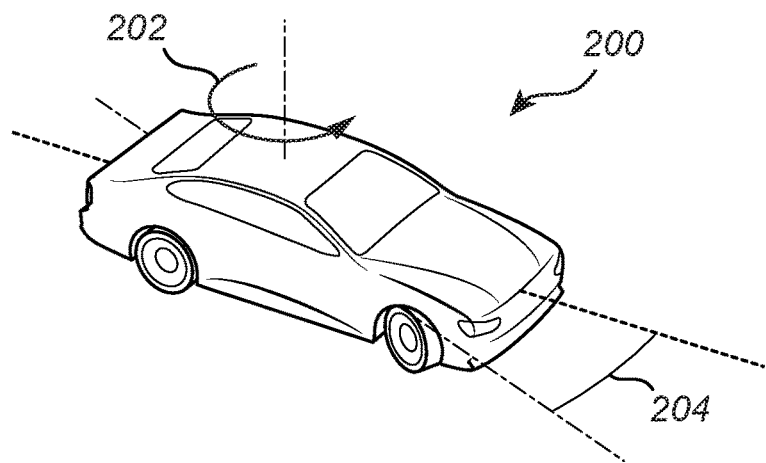
Figure 2C:
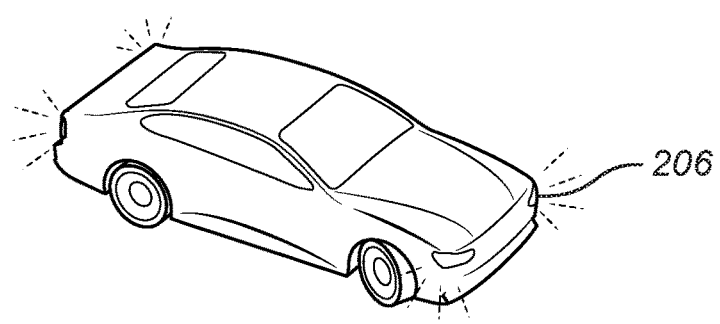

FIGS. 2A-C schematically illustrate a situation where the above described method is utilized. In FIG. 2A, a vehicle 200 is driving in a straight line with both yaw rate and sideslip angle being zero.

In FIG. 2B, it is illustrated that the driver loses control of the vehicle 200 such that the vehicle skids and/or spins, in turn resulting in a non-zero yaw rate and sideslip angle. The yaw rate 202 is illustrated as a rotation 202 of the vehicle 200 about a vertical axis, and the sideslip angle 204 is illustrated as the angle between the direction and the alignment of the vehicle.

In FIG. 2C, the vehicle has reached a standstill and the warning lights 206 have been activated.

Figure 3:
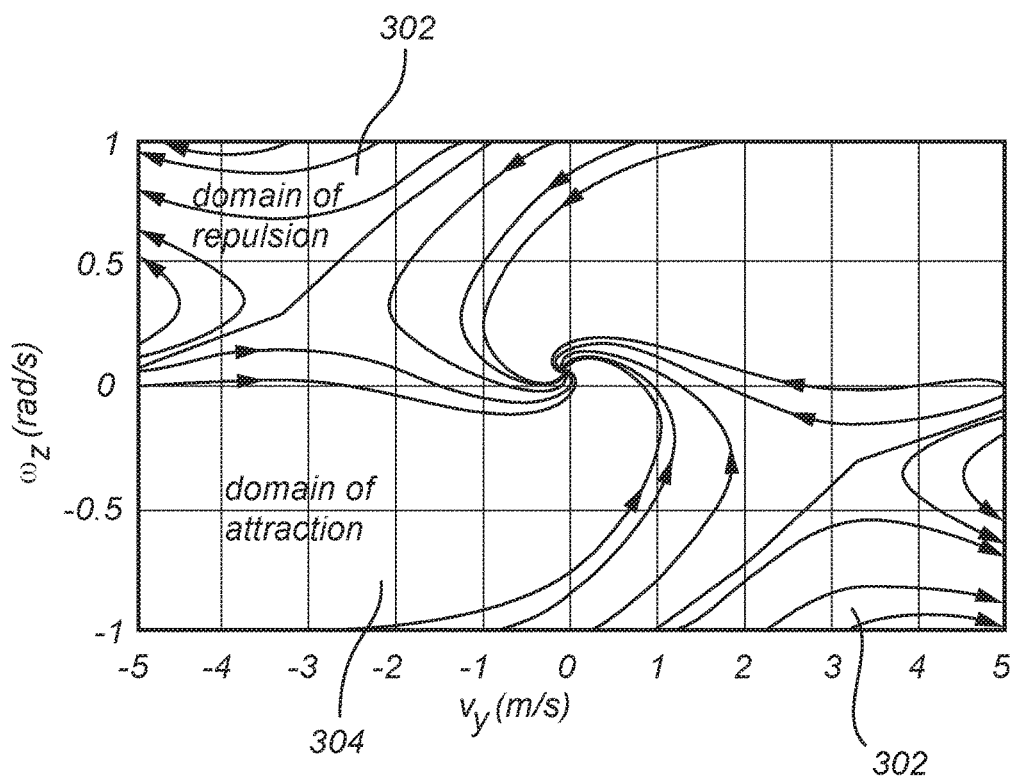
FIG. 3 schematically illustrates a vehicle according to an embodiment of the disclosure.

The phase diagram of yaw rate $\omega_z$ (rad/s) and lateral acceleration $v_y$ (m/s) in FIG. 3 shows that there is a domain of repulsion 302 and a domain of attraction 304 for the vehicle. If the vehicle is in the domain of attraction 304 it will stabilize to low yaw rate and sideslip values. On the other hand, if the vehicle is in the domain of repulsion 302, the vehicle will no longer be able to stabilize. As can be seen from the diagram, the vehicle will be in an unstable state at varying combinations of lateral velocity and yaw rate. The following three examples taken from the diagram illustrate different cases where the vehicle is unstable, i.e., where the vehicle is located in the domain of repulsion:

1) $\omega_z=0.5$ rad/s (29 deg/s) and $v_y=-3$ m/s (6 deg sideslip at 27 m/s);

2) $\omega_z=0.1$ rad/s (6 deg/s) and $v_y=-5$ m/s (11 deg sideslip at 27 m/s);

3) $\omega_z=1.0$ rad/s (57 deg/s) and $v_y=-1$ m/s (2 deg sideslip at 27 m/s).

The above examples show that it is not sufficient to examine just yaw rate or sideslip angle to determine if a vehicle is stable. Since the phase diagram will change based on chassis parameters, tire type, tire wear, road friction etc., it is important to find threshold values that regardless of these parameters indicate an instable vehicle. For this reason, rather high values for both side slip and yaw rate have been selected in the present examples to be sure that the vehicle is unstable. In particular, the sideslip angle threshold value is selected in the range of 10-30°, such as 20°, and the yaw rate threshold value is selected in the range of 30-50°/s, such as 40°/s.

Another way of motivating and selecting the threshold values may be based on the steering properties of the vehicle. In order to stabilize an over steering vehicle the driver needs to reduce the side slip angle at the front tire in order to reduce the lateral tire force. The driver can however not reduce the tire force if it would require that the steering angle is greater than the largest possible steering angle, which is typically 540°, which with a steering ratio of 17 equals a tire steer angle of 30 deg. As an additional condition the yaw rate has to be large in order to be certain that the driver is not in a stable drift, which would result in a large sideslip angle and a low yaw rate.

Figure 4:
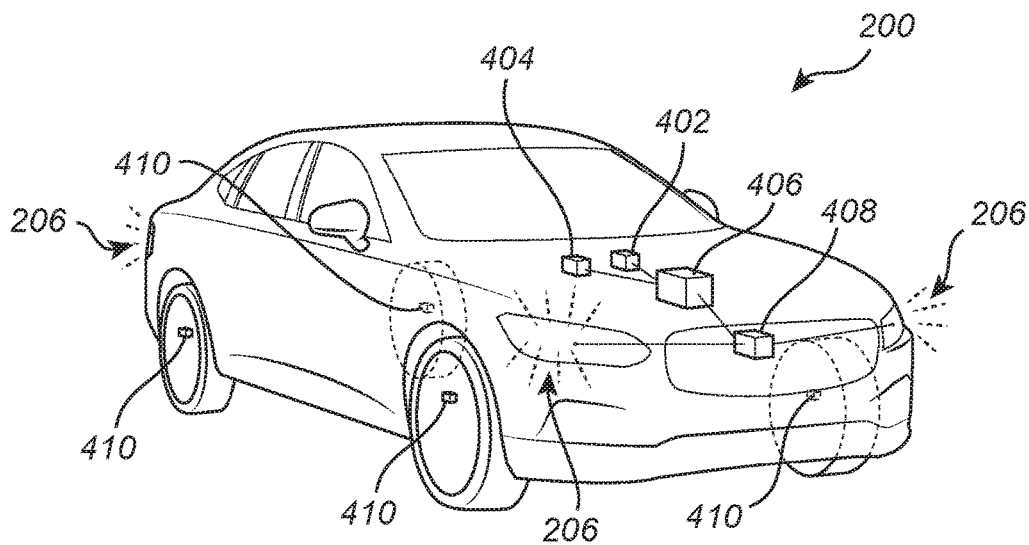
FIG. 4 is a phase diagram of yaw rate and lateral velocity.

FIG. 4 schematically illustrate a vehicle 200 comprising a control system for activating warning lights in a vehicle according to embodiments of the disclosure. The control system comprises a yaw rate detection module 402 a sideslip angle detection module 404, a comparing module 406 configured to compare the yaw rate to a predetermined yaw rate value and to compare the sideslip angle to a predetermined sideslip angle value, a control module 408 for controlling activation of the warning lights 206. The control module 408 is further configured to activate the warning lights 206 if it is determined that the vehicle reaches a standstill within a predetermined time after said yaw rate and sideslip values have been exceeded. The control system also comprises wheel speed sensors 410 for all four wheels of the vehicle to determine a standstill of the vehicle.

As one skilled in the art would understand, the control system and modules 402, 404, 406 and 408 may individually, collectively, or in any combination comprise appropriate circuitry, such as one or more appropriately programmed processors (e.g., one or more microprocessors microcontrollers and/or programmable digital signal processors) and associated memory, which may include stored operating system software and/or application software (e.g., computer readable program instructions) executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Even though the disclosure has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method for activating warning lights in a vehicle, the method comprising:
    determining a yaw rate of the vehicle;
    determining a sideslip angle of the vehicle;
    comparing the yaw rate to a predetermined yaw rate threshold value;
    comparing the sideslip angle to a predetermined sideslip angle threshold value; and
    if the yaw rate exceeds the predetermined yaw rate threshold value;
    if the sideslip angle exceeds the predetermined sideslip angle threshold value; and
    if it is determined that the vehicle reaches a standstill within a predetermined time after the yaw rate and sideslip angle threshold values have been exceeded, activating warning lights of the vehicle.

2. The method according to claim 1 wherein the predetermined sideslip angle threshold value is in the range of 10-30°.

3. The method according to claim 1 wherein the predetermined yaw rate threshold value is in the range of 30-50°/s.

4. The method according to claim 1 wherein the steps of determining a yaw rate of the vehicle and determining a sideslip angle of the vehicle are performed substantially simultaneously.

5. The method according to claim 1 wherein the predetermined time is determined based on a speed of the vehicle at the time when it is determined that the sideslip angle and the yaw rate exceed the predetermined threshold values.

6. The method according to claim 5 wherein the predetermined time based on the speed of the vehicle is reduced if it is determined that a brake pressure exceeds a predetermined brake pressure value and/or if it is determined that the engine torque is below a predetermined engine torque value.

7. The method according to claim 1 wherein determining that the vehicle reaches a standstill comprises determining a wheel speed for all four wheels of the vehicle.

8. The method according to claim 1 wherein the yaw rate of the vehicle and the sideslip angle of the vehicle are determined continuously during operation of the vehicle.

9. The method according to claim 1 wherein the sideslip angle of the vehicle is determined based on a wheel speed of all four wheels, a longitudinal acceleration, a lateral acceleration, a roll rate and a yaw rate of the vehicle.

10. The method according to claim 9 wherein the sideslip angle is further determined based on a vertical acceleration of the vehicle.

11. A control system for activating warning lights in a vehicle, the control system comprising:
- a yaw rate detection module configured to detect a yaw rate;
- a sideslip angle detection module configured to detect a sideslip angle;
- a comparing module configured to compare the yaw rate to a predetermined yaw rate value and to compare the sideslip angle to a predetermined sideslip angle value; and
- a control module for controlling activation of the warning lights;
- wherein the control module is further configured to activate the warning lights if it is determined that the vehicle reaches a standstill within a predetermined time after the predetermined yaw rate and sideslip angle values have been exceeded.

12. The control system according to claim 11 wherein the predetermined side slip angle value is in the range of 10-30°.

13. The control system according to claim 11 wherein the predetermined yaw rate value is in the range of 30-50°/s.

14. The control system according to claim 11 wherein the yaw rate of the vehicle and the sideslip angle of the vehicle are determined substantially simultaneously.

15. The control system according to claim 11 wherein the sideslip angle detection module comprises wheel speed sensors, a longitudinal acceleration sensor, a lateral acceleration sensor, a roll rate sensor and a yaw rate sensor.

16. A method for activating a warning light of a vehicle, the method comprising:
- determining a yaw rate of the vehicle;
- determining a sideslip angle of the vehicle;
- comparing, by a control system, the yaw rate to a predetermined yaw rate threshold value;
- comparing, by the control system, the sideslip angle to a predetermined sideslip angle threshold value; and
- activating, by the control system, the warning light if it is determined that the vehicle reaches a standstill within a predetermined time after the predetermined yaw rate and sideslip angle threshold values have been exceeded.

17. The method according to claim 16 wherein the predetermined sideslip angle threshold value is in the range of 10-30°.

18. The method according to claim 16 wherein the predetermined yaw rate threshold value is in the range of 30-50°/s.

19. The method according to claim 16 wherein the steps of determining a yaw rate of the vehicle and determining a sideslip angle of the vehicle are performed substantially simultaneously.

20. The method according to claim 16 wherein the predetermined time is determined based on a speed of the vehicle at the time when it is determined that the sideslip angle and the yaw rate exceed the predetermined threshold values.

* * * * *